United States Patent
Demel et al.

[11] Patent Number: 5,970,586
[45] Date of Patent: Oct. 26, 1999

[54] COMPONENT FOR FASTENING A PROFILED SEAL TO THE EDGE OF A METAL SHEET

[75] Inventors: Otto Demel, Heidelberg; Markus Senftleber, Ketsch; Ralf Sehr, Losheim; Manfred Michels, Nonnweiler-Sitzerath, all of Germany

[73] Assignees: Mecano Rapid GmbH, Heidelberg; Saar-Gummiwerk GmbH, Wadern-Bueschfeld, both of Germany

[21] Appl. No.: 09/077,114
[22] PCT Filed: Nov. 21, 1996
[86] PCT No.: PCT/DE96/02260
  § 371 Date: Aug. 24, 1998
  § 102(e) Date: Aug. 24, 1998
[87] PCT Pub. No.: WO97/20147
  PCT Pub. Date: Jun. 5, 1997

[30] Foreign Application Priority Data
Nov. 25, 1995 [DE] Germany .......................... 195 43 971

[51] Int. Cl.⁶ ........................... A44B 21/00; B60J 10/00; F16B 5/00
[52] U.S. Cl. ................... 24/555; 24/541; 24/563
[58] Field of Search ............... 24/555, 545, 563, 24/562, 541, 297, 542, 295, 289, 3.11, 3.12

[56] References Cited

U.S. PATENT DOCUMENTS

| | | | |
|---|---|---|---|
| 1,443,169 | 1/1923 | Conrad | 24/555 |
| 3,086,264 | 4/1963 | Tindall | 24/562 |
| 3,256,577 | 6/1966 | Bright | 24/563 |
| 3,286,963 | 11/1966 | Bergman | 24/542 |
| 3,797,076 | 3/1974 | Watkin | 24/562 |
| 4,074,465 | 2/1978 | Bright | 24/289 |
| 5,692,273 | 12/1997 | Rodde | 24/541 |

FOREIGN PATENT DOCUMENTS

| | | | |
|---|---|---|---|
| 1090528 | 10/1960 | Germany | 24/562 |
| 1575105 | 11/1969 | Germany . | |

*Primary Examiner*—Victor N. Sakran
*Attorney, Agent, or Firm*—Milde, Hoffberg & Macklin, LLP

[57] ABSTRACT

The invention relates to a component for fastening a profile washer to a edge strip of a sheet which is surrounded by a groove in the profile washer. When assembled, a resilient metal clamp (1) surrounds with two legs (2,3) the edge strip. An intermediate layer (6,26) of a lower level of hardness is provided between the metal bracket (1) and the edge strip. The distance between the legs (2,3) lessens in the end regions (4,5) thereof, and widens again at the ends thereof.

8 Claims, 1 Drawing Sheet

COMPONENT FOR FASTENING A PROFILED SEAL TO THE EDGE OF A METAL SHEET

BACKGROUND OF THE INVENTION

This invention relates to an element for fixing a profiled seal to the edge strip of a metal sheet, which edge strip is embraced by a groove in the profiled seal.

In vehicle construction in particular, profiled seals are frequently placed on the edge strips of metal sheets. In order to increase the holding force, tongues oriented towards the metal sheet edge are provided in the groove which is provided for the metal sheet edge. However, the holding forces which can thereby be attained are not sufficient for all specific applications, and are insufficient for low metal sheet thicknesses in particular.

A device which comprises continuous clamping strips for the mounting of decorative and sealing strips on a supporting flange has become known from German Patent Publication No. 1,575,105. This device is completely embedded in an extensible coating material, which may be made of plastics or rubber. However, when a device such as this is pushed on to the edge the coating material which is situated inside the clamping strip can be damaged, so that firstly the metal support can cause damage to the lacquer and secondly the damaged areas of the coating material can be further torn open under subsequent stress.

SUMMARY OF THE INVENTION

The object of the present invention is therefore to provide a fixing element which can be incorporated in profiled seals by vulcanising or injecting the seal material therein, and which gives the profiled seal a secure hold on the edge strip of the metal sheet without damaging a lacquer coat which is present on the metal sheet.

This object is achieved according to the invention in that two limbs of a resilient metal clip, which is constructed for embedding in the profiled seal, embrace a U-shaped plastics part, which is constructed in such a way that it surrounds the edge strip when the profiled seal is fixed and serves as an intermediate layer between the metal clip and the edge strip, that the spacing between the limbs narrows in end regions of the limbs and widens again at the ends of the limbs, and that the U-shaped plastics part has a shape which is matched to the narrowed regions between the limbs and has a lower hardness than the metal clips.

The fixing element according to the invention imparts a firm hold to the profiled seal in which it is enclosed, and moreover prevents damage to a protective layer, particularly a lacquer coat, which is provided on the metal sheet.

In one embodiment of the invention, outside the narrowed regions of the limbs the plastics part is narrower than the spacing between the limbs. By means of this embodiment, rubber or another material which is provided for the profiled seal can penetrate the intermediate space between the metal clip and the plastics part when it is vulcanised on to or injected round the fixing element according to the invention, and can thus create a strong joint between the profiled seal and the fixing element.

To ensure that the plastics part is centrally seated inside the metal clip when injection is effected round the fixing element, provision is made in an advantageous form of this embodiment for each of the limbs of the metal clip to have at least one inwardly oriented embossed formation outside the narrowed regions, for centring the plastics part.

In another embodiment of the invention, the fixing of the plastics part inside the metal clip is improved in that the plastics part is of greater width following the narrowed regions than it is outside the narrowed regions.

Another embodiment of the invention likewise serves for the fixing of the plastics part in the metal clip and consists of the plastics part having at least one projection which fits into an opening in the metal clip. At the same time, displacement in the direction of the sheet metal edge is prevented in particular by arranging for the projection to be a rib which extends transversely to the direction of the metal sheet edge and which fits into an open slot at the end of the limb.

A further improvement in the hold of the first form of construction inside the profiled seal can be achieved if the plastics part is trapezoidal, wherein the shorter side runs at the sheet metal edge and the longer side is situated outside the ends of the limbs of the metal clip. In this embodiment, the material of the profiled seal penetrates the triangular cavities formed by the shortening of the plastics part in the interior of the metal clip.

An example of an embodiment of the invention is explained in more detail in the description given below and is illustrated in the drawings,

DESCRIPTION OF THE PREFERRED EMBODIMENTS

Figure 1:
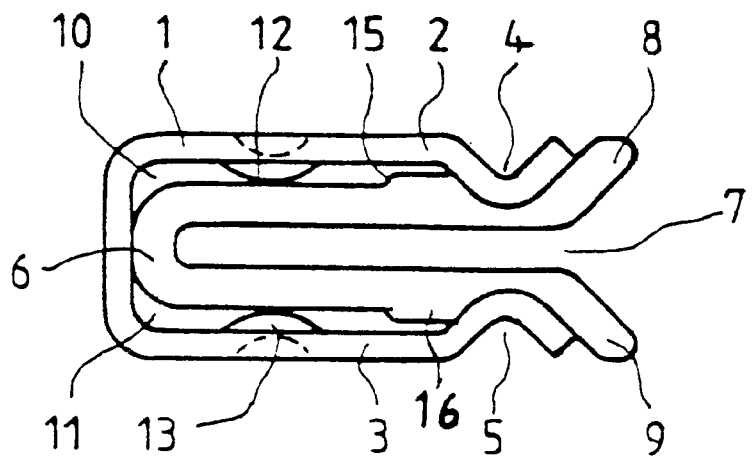
FIG. 1 is a first view of the preferred embodiment.
Figure 2:
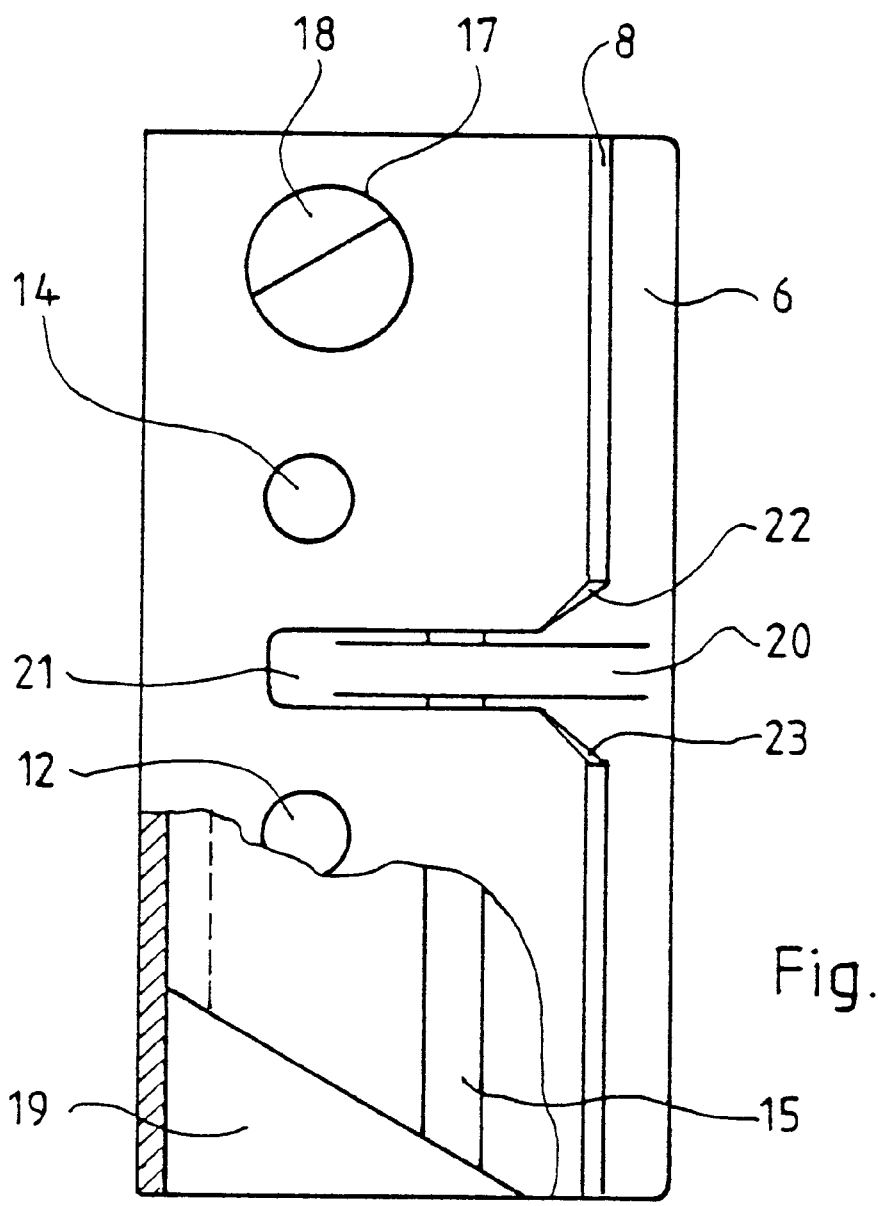
FIG. 2 is a second view of the embodiment shown in FIG. 1.

Identical parts are denoted by identical reference numerals in the Figures. The illustrations are considerably enlarged compared with the customary dimensions for the fixing element according to the invention.

The embodiment exemplified consists of a metal clip 1 with two limbs 2, 3. The limbs are bent inwards and bent outwards again at their ends, so that the spacing between the limbs 2, 3 narrows there. A U-shaped plastics part 6 forms a groove 7 into which an edge strip of a metal sheet, which is not illustrated, is introduced. At the same time, the limbs 2, 3 of the metal clip are bent towards each other in such a way that an initial stress acts on the metal sheet. In the end region, the ends 8, 9 of the limbs of the U-shaped plastics part 6 lead outwards, as do those of the metal clip. The introduction of the metal sheet is thereby facilitated.

Inside the metal clip 1, the plastics part 6 is narrower than the spacing between the limbs of the metal clip, so that cavities 10, 11 are formed into which the rubber or another material of the profiled seal penetrates when it is vulcanised on to or injected round the fixing element. Embossed formations 12, 13, 14, which centre the plastics part 6 inside the metal clip 1, are situated in the limbs. Following the narrowed portion of the metal clip at 4, 5 the plastics part 6 has ribs 15, 16, to prevent the plastics part from slipping out of the metal clip 1.

The limbs 2, 3 of the metal clip 1 comprise holes 17, so that the material of the profiled seal can enter the cavities 10, 11 during the injection coating operation. Moreover, due to the trapezoidal construction of the plastics part 6, material of the profiled seal enters the triangular cavities 18, 19, which improves the hold of the fixing element in the profiled seal.

A rib 20, which extends transversely to the metal sheet edge and which fits into a laterally open slot 21 on the metal clip 1, is provided on the plastics part 6. Displacement of the plastics part inside the metal clip is thereby prevented. The opening of the slot 21 is bevelled at 22, 23, in order to facilitate the insertion of the plastics part 6 in the metal clip 1.

There has thus been shown and described a novel component for fastening a profile washer which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an element for fixing a profiled seal to the edge strip of a metal sheet, which edge strip is embraced by a groove in the profiled seal, the improvement wherein two limbs of a resilient metal clip, which is constructed for embedding in the profiled seal, embrace a U-shaped plastic part, which is constructed in such a way that it surrounds the edge strip when the profiled seal is fixed and serves as an intermediate layer between the metal clip and the edge strip, wherein the spacing between the limbs narrows in end regions of the limbs and widens again at the ends of the limbs, and wherein the U-shaped plastic part has a shape which is matched to the narrowed regions between the limbs and has a lower hardness than the metal clips.

2. A fixing element according to claim 1, wherein outside the narrowed regions of the limbs the plastic part is narrower than the spacing between the limbs.

3. A fixing element according to claim 2, wherein outside the narrowed regions the limbs of the metal clip each comprise at least one inwardly oriented embossed formation for centering the plastic part.

4. A fixing element according to claim 2, wherein the plastic part has a greater width following the narrowed regions than outside the narrowed regions.

5. A fixing element according to claim 2, wherein the plastics part has at least one projection which fits into an opening in the metal clip.

6. A fixing element according to claim 5, wherein the projection is a rib which extends transversely to the direction of the sheet metal edge and which fits into an open slot at the end of the limb.

7. A fixing element according to claim 2, wherein the plastic part is trapezoidal, wherein the shorter side runs at the sheet metal edge and the longer side is situated outside the ends of the limbs of the metal clip.

8. A fixing element according to claim 1, wherein the U-shaped plastic part has opposing, inner planar surfaces which contact the edge strip.

* * * * *